(12) United States Patent
Hirata et al.

US006329843B1

(10) Patent No.: US 6,329,843 B1
(45) Date of Patent: Dec. 11, 2001

(54) OUTPUT DRIVER WITH CURRENT COMPENSATION CIRCUIT FOR VARIATION OF COMMON MODE VOLTAGE

(75) Inventors: Takashi Hirata; Hironori Akamatsu; Satoshi Takahashi; Yutaka Terada; Yoshihide Komatsu, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/684,979

(22) Filed: Oct. 10, 2000

(30) Foreign Application Priority Data

Oct. 14, 1999 (JP) .................................................. 11-292029

(51) Int. Cl.[7] .............................................. H03K 19/0175
(52) U.S. Cl. .................................. 326/82; 326/83; 326/26
(58) Field of Search .................................. 326/82, 26, 27, 326/30, 83, 86, 89, 90

(56) References Cited

U.S. PATENT DOCUMENTS

| 5,187,448 | 2/1993 | Brooks et al. . |
| 5,338,987 | * 8/1994 | Tomasetti et al. ...................... 326/89 |
| 5,418,478 | 5/1995 | Van Brunt et al. . |
| 5,539,771 | 7/1996 | Noda et al. . |
| 5,592,510 | 1/1997 | Van Brunt et al. . |
| 5,644,258 | 7/1997 | Wu . |
| 5,939,904 | 8/1999 | Fetterman et al. . |
| 6,034,537 | 3/2000 | Burrows et al. . |
| 6,107,882 | 8/2000 | Gabara et al. . |
| 6,166,570 | * 12/2000 | Hedberg ................................. 326/26 |

OTHER PUBLICATIONS

U.S.P.T.O. Office Action for related application U.S.S.N. 09/521,461 dated Jun. 20, 2001.

* cited by examiner

*Primary Examiner*—Michael Tokar
*Assistant Examiner*—Don Phu Le
(74) *Attorney, Agent, or Firm*—McDermott, Will & Emery

(57) ABSTRACT

A current driver, a common mode voltage monitoring circuit and a current compensator are provided to drive a twisted pair cable, which is made up of two signal lines coupled to a terminal bias voltage through respective terminal resistors. The common mode voltage monitoring circuit monitors a difference between a common mode voltage of the twisted pair cable and a supply voltage level for the current driver. And the current compensator is coupled to the twisted pair cable to compensate for an output current of the current driver in accordance with a result of monitoring performed by the common mode voltage monitoring circuit. If the current driver has decreased its current drivability due to a drop of the supply voltage level of the current driver or a variation in the common mode voltage of the twisted pair cable, then the current compensator compensates for the decrease. Thus, the current driver can continuously operate in a broad voltage range to supply a constant current.

11 Claims, 9 Drawing Sheets

OUTPUT DRIVER WITH CURRENT COMPENSATION CIRCUIT FOR VARIATION OF COMMON MODE VOLTAGE

BACKGROUND OF THE INVENTION

The present invention generally relates to a semiconductor integrated circuit and more particularly relates to a current driver circuit for use in a high-speed interface.

A differential interface using a twisted pair cable, consisting of two signal lines that are coupled to a terminal bias voltage via respective terminal resistors, is preferred to realize high-speed data transmission. In transmitting data through this interface, first, a current driver on the transmitting end supplies a current with constant amplitude into the twisted pair cable. Then, a receiver circuit on the receiving end senses a potential difference that has been generated between both terminals of the terminal resistors to have small and constant amplitude.

A current driver circuit, compatible with the IEEE 1394 communication standard defined for high-speed serial interfaces, is disclosed in U.S. Pat. No. 5,592,510 (issued to Van Brunt et al. on Jan. 7, 1997). The current driver circuit of Van Brunt et al. monitors a current output to a twisted pair cable and compensates for the output current based on the result of this monitoring so that the current has constant amplitude.

To further reduce the design rules for semiconductor processes and further cut down on the power consumed by resultant products, a supply voltage must be lowered. However, if the supply voltage Vdd is decreased with a terminal bias voltage Tpbias kept constant, then Vdd will be more proximate to Tpbias. Then, the drain-source voltage of PMOS current source transistors in a current driver will decrease and the PMOS current source transistors will reach a non-saturated region. That is to say, the transistors cannot operate anymore to supply a constant current. For that reason, an allowable range of Vdd is adversely limited to make the output current fall within a prescribed range. If Vdd is raised, on the other hand, the PMOS current source transistors will operate in a saturated region. However, the resistance of the drain region will rise, thus gradually increasing the amount of the output current flowing. To avoid such increase in the output current, there will almost no choice but providing a dedicated power supply for the PMOS current source transistors. Nevertheless, this is not a practical measure to be taken, because the dedicated power supply will increase the overall power consumption and production cost.

On the other hand, when Tpbias is determined on the receiving end, the current driver on the transmitting end regards the Tpbias value as being variable with a ground level at the receiving end, for example. In this case, if Tpbias deceases, then NMOS current source transistors in the current driver will reach the non-saturated region and can no longer operate to supply a constant current. Conversely, if Tpbias increases, then the PMOS current source transistors will reach the non-saturated region and cannot operate anymore to supply a constant current, either. Taking these points into account, the Tpbias value should fall within such a range as enabling both of these two types of current source transistors to supply the constant current. However, if Vdd is reduced, then the range shrinks.

SUMMARY OF THE INVENTION

It is therefore an object of the present invention to provide a current driver circuit that can operate in a broad voltage range.

To achieve this object, an inventive current driver circuit is adapted to drive a twisted pair cable, which is made up of two signal lines coupled to a terminal bias voltage through respective terminal resistors. The driver circuit includes: a current driver coupled to the twisted pair cable; a common mode voltage monitoring circuit for monitoring a difference between a common mode voltage of the twisted pair cable and at least one supply voltage level for the current driver; and a current compensator, coupled to the twisted pair cable, for compensating for an output current of the current driver in accordance with a result of monitoring performed by the common mode voltage monitoring circuit.

In the inventive current driver circuit, if the current driver has decreased its current drivability due to a drop of the supply voltage level for the current driver or a variation in the common mode voltage of the twisted pair cable, then the current compensator operates to compensate for the decrease. Thus, the current driver can continuously operate to supply a constant current. In addition, since the difference between the common mode voltage and the supply voltage level is monitored, the current can be compensated for appropriately to reflect the drain-source voltage of current source transistors in the current driver.

DETAILED DESCRIPTION OF THE INVENTION

Hereinafter, preferred embodiments of the present invention will be described with reference to the accompanying drawings.

Figure 1:
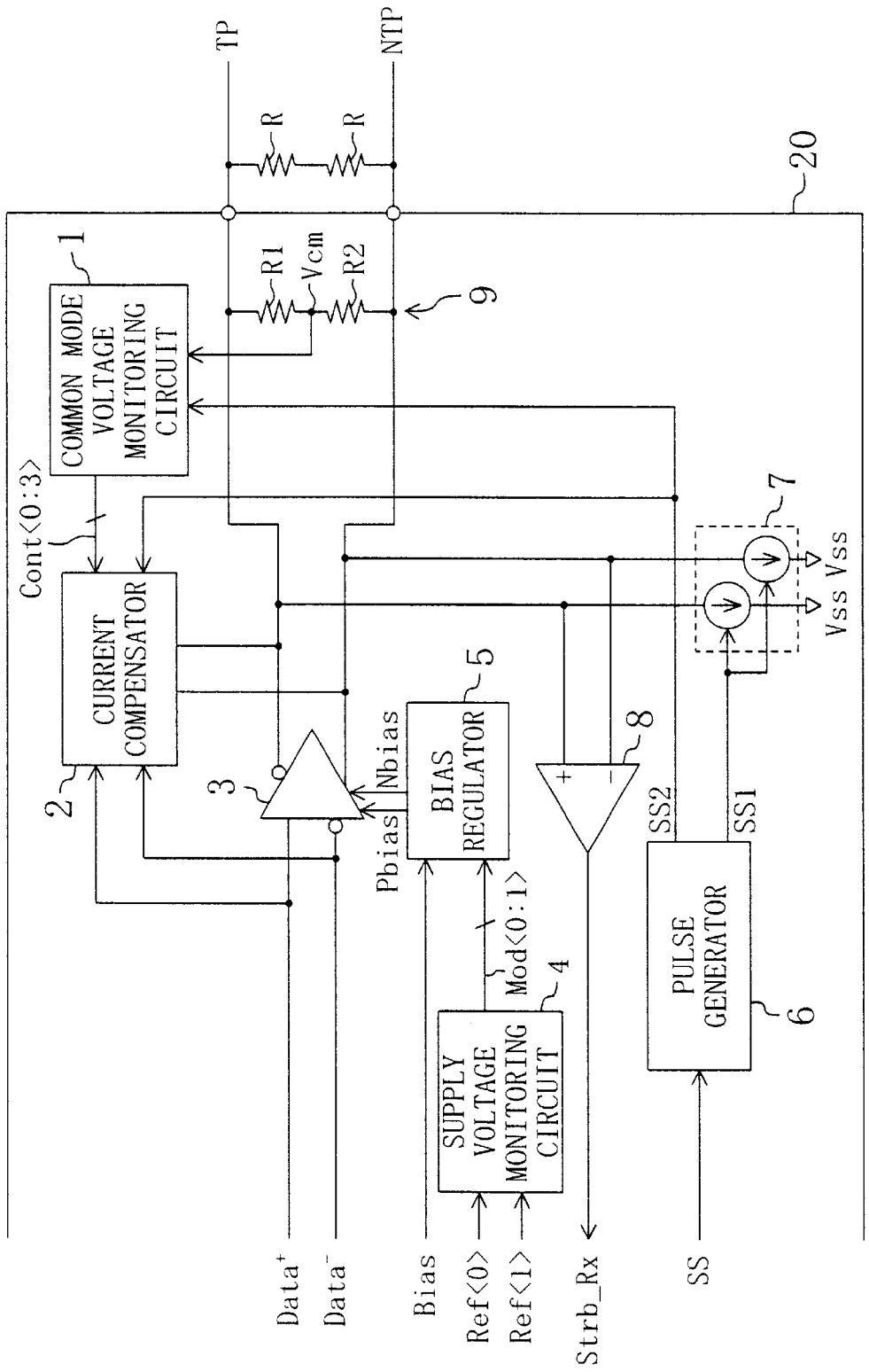
FIG. 1 is a block diagram illustrating an exemplary configuration for a transceiver including the inventive current driver circuit.

FIG. 1 illustrates an exemplary configuration for a transceiver including the inventive current driver circuit. As shown in FIG. 1, the transceiver 20 is coupled to a twisted pair cable made up of two signal lines TP and NTP. A serial circuit of two terminal resistors R is placed near the transceiver 20. The transceiver 20 includes common mode voltage monitoring circuit 1, current compensator 2, current driver 3, supply voltage monitoring circuit 4, bias regulator 5, pulse generator 6, two current sources 7, receiver 8 and resistor circuit 9.

The current driver 3 drives the twisted pair cable TP/NTP responsive to a differential data signal Data+/Data– and includes PMOS and NMOS current source transistors as will be described later. The receiver 8 receives a strobe signal $Strb_{13}Rx$.

The resistor circuit 9 is made up of two resistors R1 and R2 that are provided within this LSI to sense a common mode voltage Vcm of the twisted pair cable. The common mode voltage monitoring circuit 1 monitors and estimates a difference between a first supply voltage level Vdd coupled to the source of the PMOS current source transistor in the current driver 3 and the common mode voltage Vcm. The circuit 1 also monitors and estimates a difference between the common mode voltage Vcm and a second supply voltage level Vss (i.e., a ground potential) coupled to the source of the NMOS current source transistor in the current driver 3. A result Cont<0:3> of monitoring is passed to the current compensator 2. The current compensator 2 is coupled to the twisted pair cable TP/NTP so as to compensate stepwise for the output current of the current driver 3 in accordance with the monitoring result Cont<0:3>. The common mode voltage monitoring circuit 1 and current compensator 2 are provided to compensate for a deficit of the output current in a situation where one of the current source transistors in the current driver 3 has reached a non-saturated region. According to the present invention, the current is compensated for stepwise, and therefore, the current is controllable easily with oscillation suppressed.

The supply voltage monitoring circuit 4 monitors and estimates the Vdd level with reference to reference potentials Ref<0:1>. A result Mod<0:1> of monitoring is passed to the bias regulator 5. The bias regulator 5 regulates gate bias voltages Pbias and Nbias of the PMOS and NMOS current source transistors in the current driver 3 relative to a reference bias Bias so as to compensate for the output current of the current driver 3 in accordance with the monitoring result Mod<0:1>. The supply voltage monitoring circuit 4 and bias regulator 5 are provided to compensate for the variation in the amount of current flowing due to a drain resistance of the PMOS current source transistor in the current driver 3 when the transistor operates in a saturated region.

The transceiver 20 shown in FIG. 1 can also transmit information by compulsorily changing the common mode voltage Vcm of the twisted pair cable. The pulse generator 6 and two current sources 7 are provided for this particular purpose. For example, when a speed signal SS representing transfer rate information is asserted, the pulse generator 6 sends a signal SS1 to the current sources 7, which are coupled to the two signal lines TP and NTP of the twisted pair cable, to turn these current sources 7 ON at a time. That is to say, the transfer rate information is transmitted by lowering Vcm for a certain period of time (e.g., about 100 ns). However, if Vcm changed steeply, then the current compensator 2 might operate erroneously. To avoid this potential problem, the pulse generator 6 supplies a signal SS2 to the common mode voltage monitoring circuit 1 and current compensator 2. In this manner, Vcm input of the common mode voltage monitoring circuit 1 and the output of the current compensator 2 can be decoupled from the twisted pair cable in an interval during which the speed signal SS is transmitted.

Figure 2:
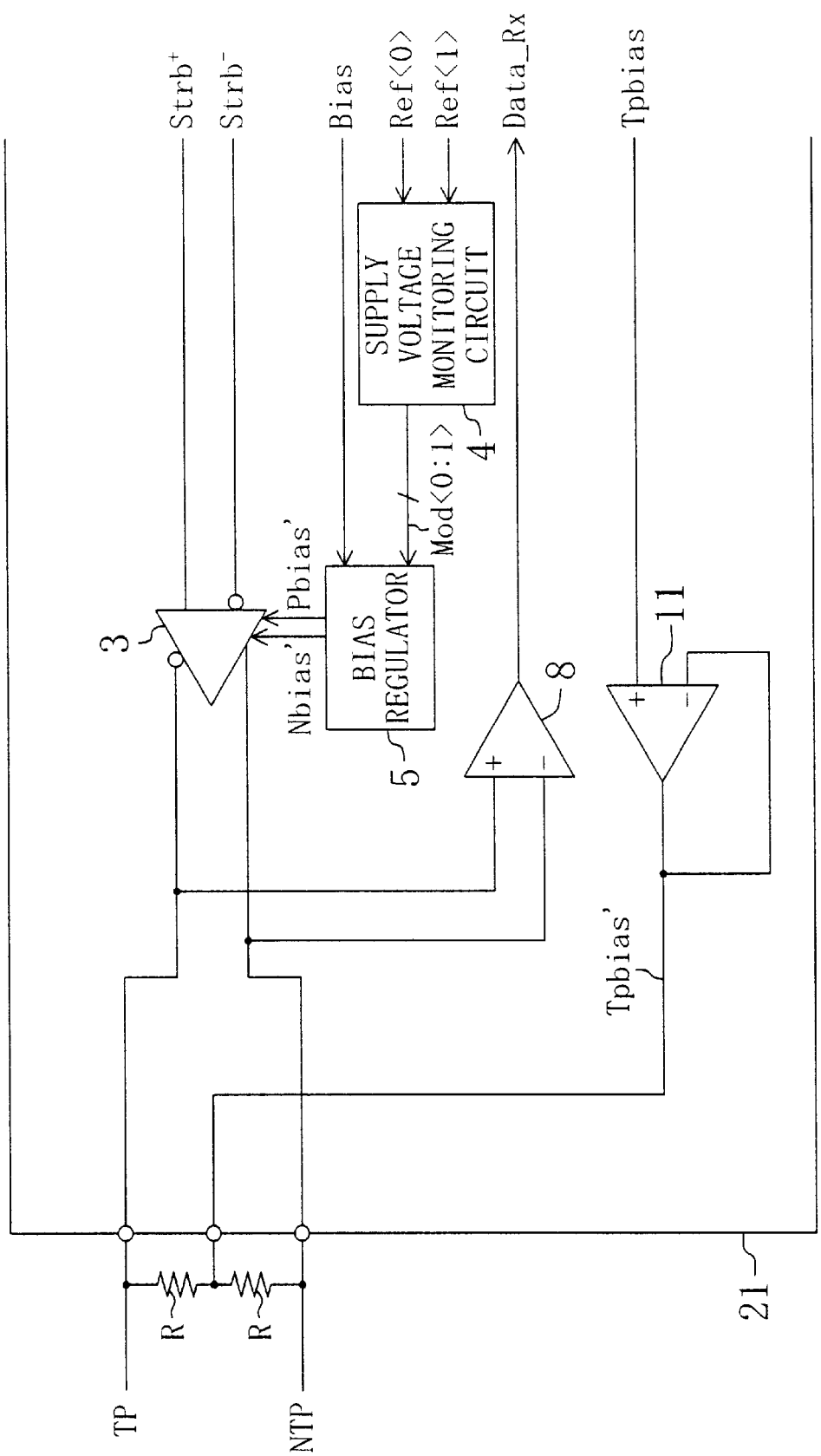
FIG. 2 is a block diagram illustrating an exemplary configuration for a transceiver on the receiving end that exchanges data with the transceiver shown in FIG. 1.

FIG. 2 illustrates an exemplary configuration for a transceiver on the receiving end that exchanges data with the transceiver 20 shown in FIG. 1. As shown in FIG. 2, the transceiver 21 on the receiving end is coupled to a twisted pair cable made up of two signal lines TP and NTP. A serial circuit of two terminal resistors R is placed near the transceiver 21. The transceiver 21 includes current driver 3, supply voltage monitoring circuit 4, bias regulator 5, receiver 8 and terminal bias voltage generator 11. The current driver 3 drives the twisted pair cable TP/NTP responsive to a differential strobe signal Strb+/Strb–. The bias regulator 5 regulates the gate bias voltages Pbias' and Nbias' of PMOS and NMOS current source transistors in the current driver 3. The receiver 8 receives a data signal Data_Rx. The terminal bias voltage generator 11 applies a terminal bias voltage Tpbias', which is equal to a given terminal bias voltage Tpbias, to an intermediate tap between the two terminal resistors R.

In the transceiver 21 shown in FIG. 2, the terminal is bias voltage generator 11 can determine by itself the common mode voltage of the twisted pair cable TP/NTP by reference to its own ground level. Thus, the transceiver 21 can easily set the biases of respective current source transistors in the current driver 3 to such values as making the transistors operate in the saturated region. Accordingly, unlike the transceiver 20 shown in FIG. 1, the transceiver 21 does not have to include the common mode voltage monitoring circuit 1 or the current compensator 2 and therefore can be of a relatively small circuit size.

Figure 3:
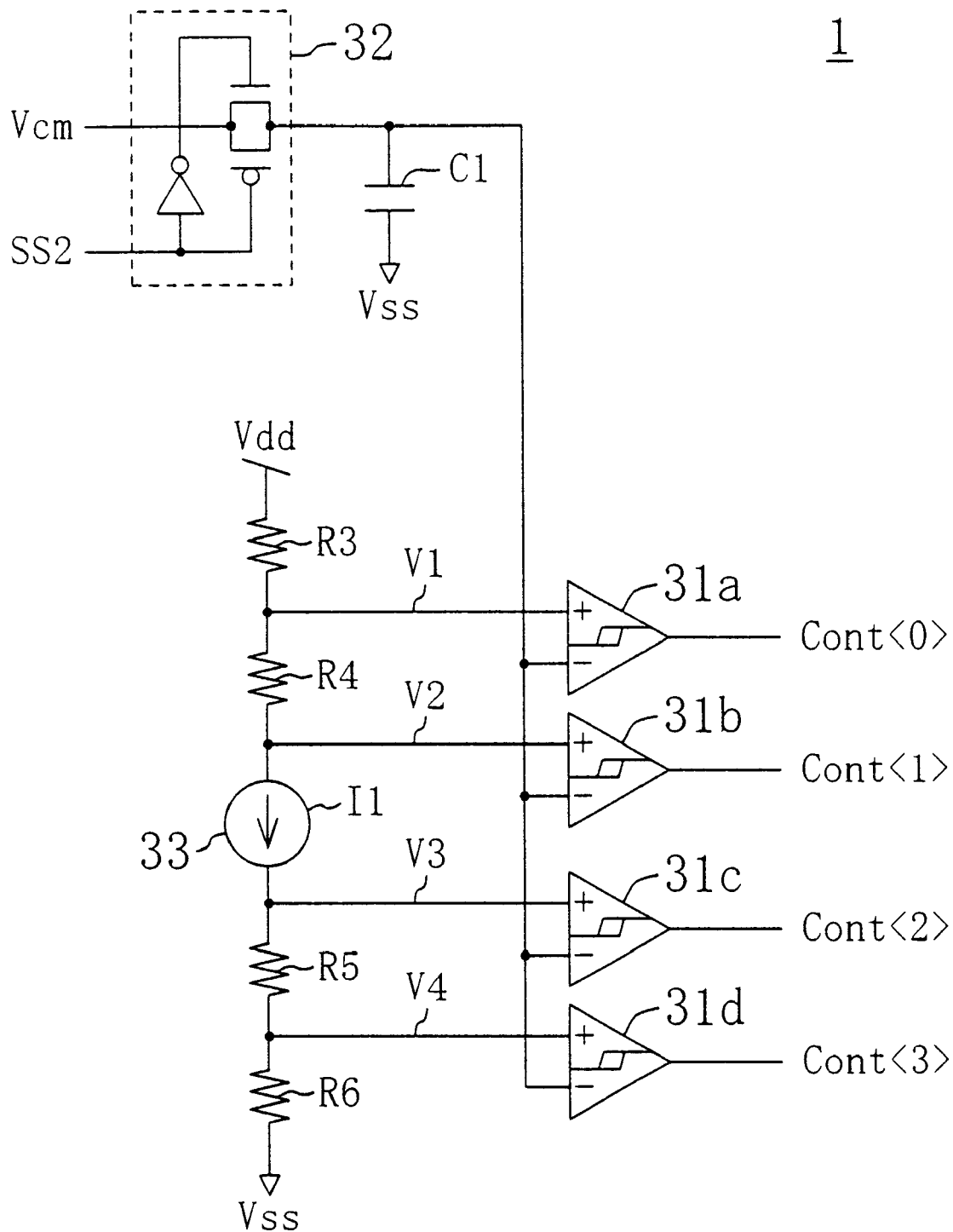
FIG. 3 is a circuit diagram illustrating the common mode voltage monitoring circuit shown in FIG. 1.

FIG. 3 illustrates a detailed configuration for the common mode voltage monitoring circuit 1 shown in FIG. 1. As shown in FIG. 3, the common mode voltage monitoring circuit 1 includes four comparators 31a through 31d, transfer gate 32, current source 33, four resistors R3 through R6 and capacitor C1.

The four resistors R3 through R6 are connected in series together between Vdd and Vss (=0 V). The current source 33 supplies a current I1 through the serial connection of these resistors R3 through R6. As a result, resistor terminal voltages V1 through V4, given by the following equations, are obtained:

$$V1 = Vdd - I1 \times R3$$

$$V2 = Vdd - I1 \times (R3 + R4)$$

$$V3 = I1 \times (R5 + R6)$$

$$V2 = I1 \times R6$$

The four comparators 31a through 31d compare the common mode voltage Vcm to the resistor terminal voltages V1 through V4, respectively, thereby obtaining Cont<0:3>. Specifically, if Vcm value is lower than V1, then Cont<0> will be "H". Alternatively, if Vcm is higher than V1, then Cont<0> will be "L". In the same way, if Vcm is lower than V2, then Cont<1> will be "H". However, if Vcm is higher than V2, then Cont<1> will be "L". Also, if Vcm is higher than V3, then Cont<2> will be "L". But if Vcm is lower than V3, then Cont<2> will be "H". Furthermore, if Vcm is higher than V4, then Cont<3> will be "L". But if Vcm is lower than V4, then Cont<3> will be "H". To avoid erroneous operation due to noise, for example, each of the comparators 31a through 31d preferably exhibits hysteresis between its input and output.

Also, in FIG. 3, the Vcm input is electrically isolated from the common mode voltage monitoring circuit 1 by asserting the SS2 signal to the "H" level in the interval during which the speed signal SS is transmitted and thereby turning the transfer gate 32 OFF. During this interval, the Vcm value is stored on the capacitor C1. In this manner, no potential difference will be created and the circuit 1 will not operate erroneously when the transmission interval of the speed signal SS expires and when the transfer gate 32 turns ON again.

Figure 4:
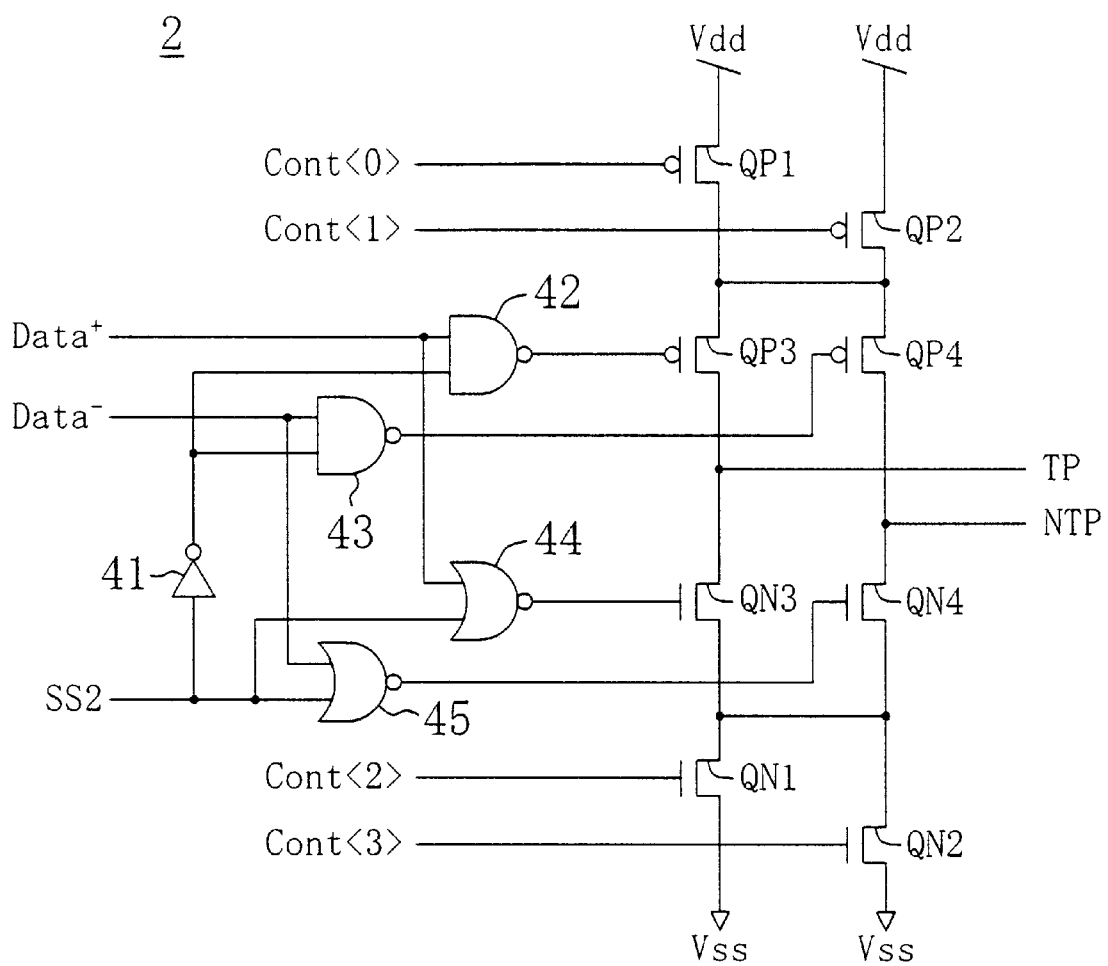
FIG. 4 is a circuit diagram illustrating the current compensator shown in FIG. 1.

FIG. 4 illustrates a detailed configuration for the current compensator 2 shown in FIG. 1. As shown in FIG. 4, the current compensator 2 includes two PMOS current source transistors QP1, QP2, two PMOS switching transistors QP3, QP4, two NMOS current source transistors QN1, QN2, two NMOS switching transistors QN3, QN4, inverter 41, two NAND gates 42, 43 and two NOR gates 44, 45.

Even if the differential data signal Data+/Data− is provided to the current compensator 2 while SS2="L", none of QP1, QP2, QN1 and QN2 performs the current compensation operation so long as Cont<0>and Cont<1>are "H" and Cont<2> and Cont<3> are "L". That is to say, this is a normal state. However, if a state transition from the normal state has occurred (e.g., if Cont<1> has fallen to "L") due to a variation of Vcm, then QP2 starts the current compensation operation by draining a current through QP3 into one TP of the signal lines or through QP4 into the other signal line NTP. Furthermore, when Cont<0> falls to "L", QP1 and QP2 start the current compensation operation. On the other hand, if a state transition from the normal state has occurred (e.g., if Cont<2> has risen to "H"), then QN1 starts the current compensation operation by absorbing a current through QN3 from one TP of the signal lines or through QN4 from the other signal line NTP. Furthermore, when Cont<3> rises to "H", QN1 and QN2 start the current compensation operation.

Moreover, in the configuration shown in FIG. 4, if the SS2 signal is asserted to "H" during the transmission interval of the speed signal SS, then QP3, QP4, QN3 and QN4 are all turned OFF. As a result, QP1, QP2, QN1 and QN2 are all decoupled from the twisted pair cable TP/NTP.

Figure 5:
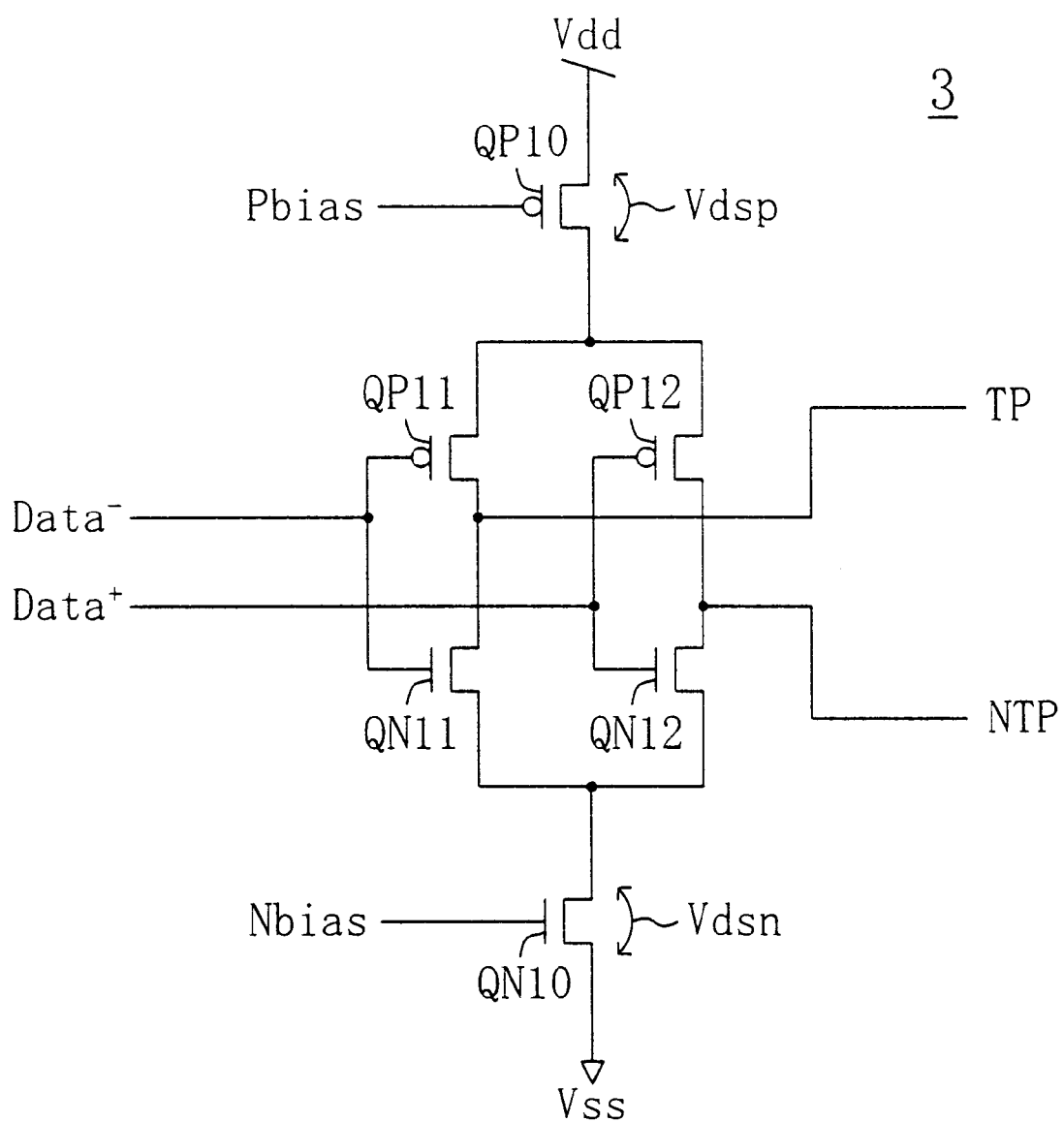
FIG. 5 is a circuit diagram illustrating the current driver shown in FIG. 1.

FIG. 5 illustrates a detailed configuration for the current driver 3 shown in FIG. 1. As shown in FIG. 5, the current driver 3 includes PMOS current source transistor QP10, two PMOS switching transistors QP11, QP12, NMOS current source transistor QN10 and two NMOS switching transistors QN11, QN12. In FIG. 5, Vdsp and Vdsn denote the drain-source voltages of QP10 and QN10, respectively.

Figure 6:
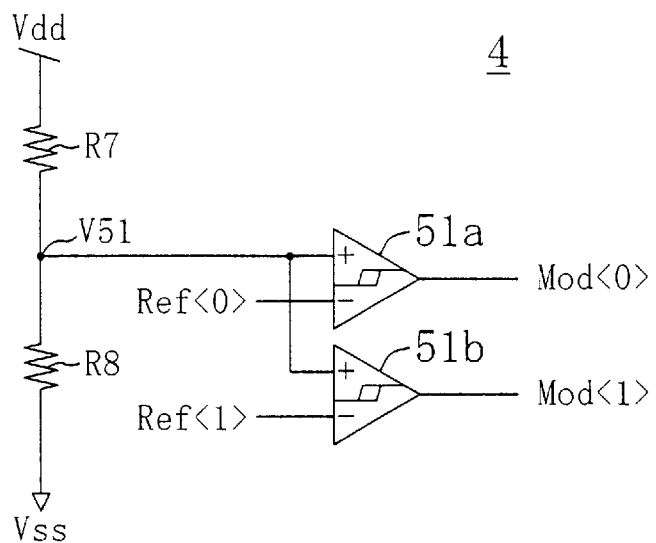
FIG. 6 is a circuit diagram illustrating the supply voltage monitoring circuit shown in FIG. 1.

FIG. 6 illustrates a detailed configuration for the supply voltage monitoring circuit 4 shown in FIG. 1. As shown in FIG. 6, the supply voltage monitoring circuit 4 includes two comparators 51a, 51b and two resistors R7, R8 having high resistance. These resistors R7 and R8 are connected in series together between Vdd and Vss (=0 V). A tap voltage V51 of this serial connection of resistors is compared by the comparators 51a and 51b to reference potentials Ref<0> and Ref<1>, respectively. Specifically, if the potential V51 is lower than Ref<0>, then Mod<0> will be "L". Alternatively, if V51 is higher than Ref<0>, then Mod<0> will be "H". In the same way, if the potential V51 is lower than Ref<1>, then Mod<1> will be "L". Alternatively, if V51 is higher than Ref<1>, then Mod<1> will be "H".

Figure 7:
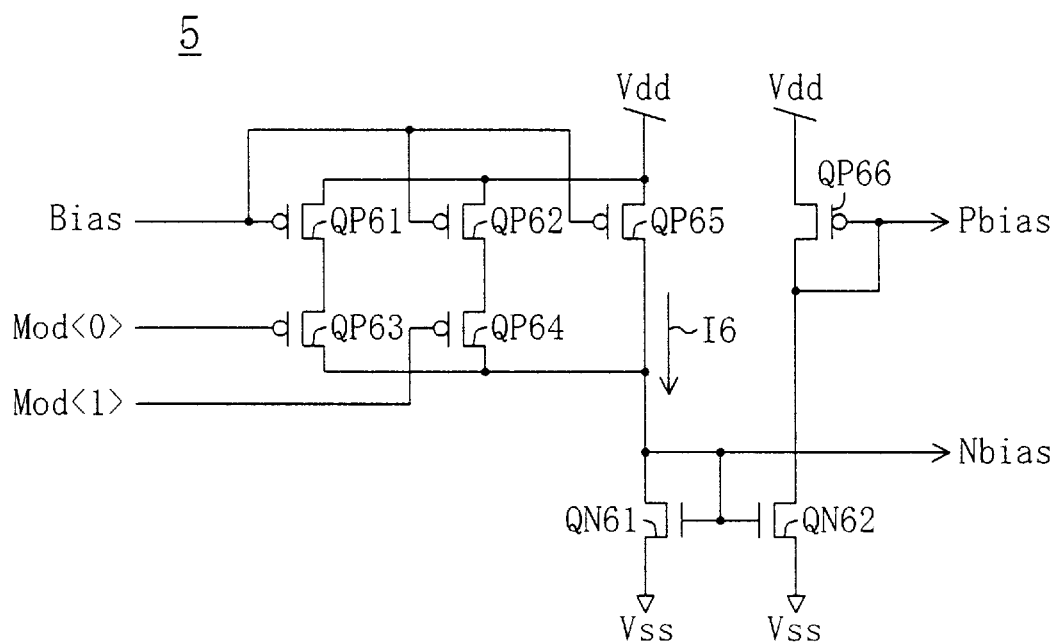
FIG. 7 is a circuit diagram illustrating the bias regulator shown in FIG. 1.

FIG. 7 illustrates a detailed configuration for the bias regulator 5 shown in FIG. 1. As shown in FIG. 7, the bias regulator 5 includes six PMOS transistors QP61 through QP66 and two NMOS transistors QN61 and QN62. QP61, QP62 and QP65 serve as respective current sources, QP63 and QP64 serve as respective switches and QN61, QN62 and QN66 together constitutes a current mirror circuit.

In the configuration shown in FIG. 7, if the supply voltage Vdd is high, then the reference bias Bias makes the current source QP65 solely operate among the three current sources. When vdd drops down to a predetermined potential, either Mod<0> or Mod<1> will fall to "L". Accordingly, one of the switches QP63 and QP64, which is associated with Mod<0> or Mod<1>, turns ON, and one of the current sources QP61 and QP62, which is associated with the ON-state switch QP63 or QP64, is added. As a result, current I6 increases. Furthermore, Pbias and Nbias also change with the increase of the current I6, and the output current of the current driver 3 increases. The variation in the amount of current flowing is controllable by adjusting the transistor size of the current source QP61 or QP62. It should be noted that the bias regulator 5 may be so constructed as to regulate the gate bias voltages of PMOS transistors and those of NMOS transistors independently.

Figure 8:
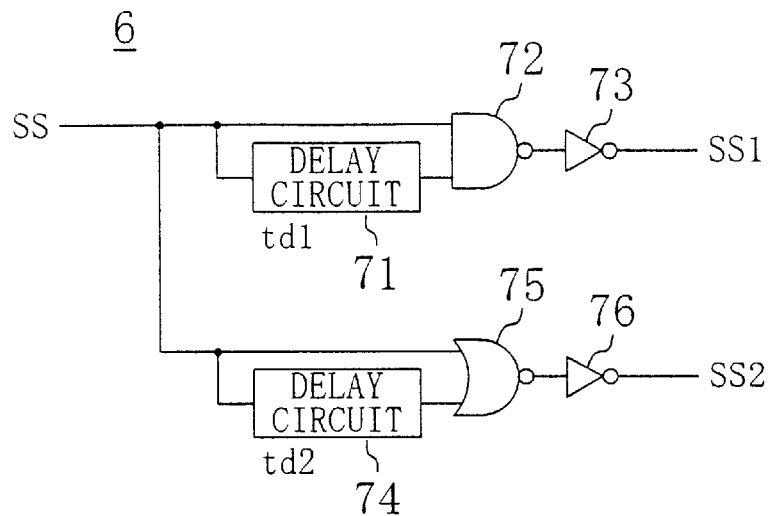
FIG. 8 is a circuit diagram illustrating the pulse generator shown in FIG. 1.

FIG. 8 illustrates a detailed configuration for the pulse generator 6 shown in FIG. 1. As shown in FIG. 8, the pulse generator 6 includes first and second delay circuits 71, 74, NAND gate 72, NOR gate 75 and two inverters 73, 76.

Figure 9:
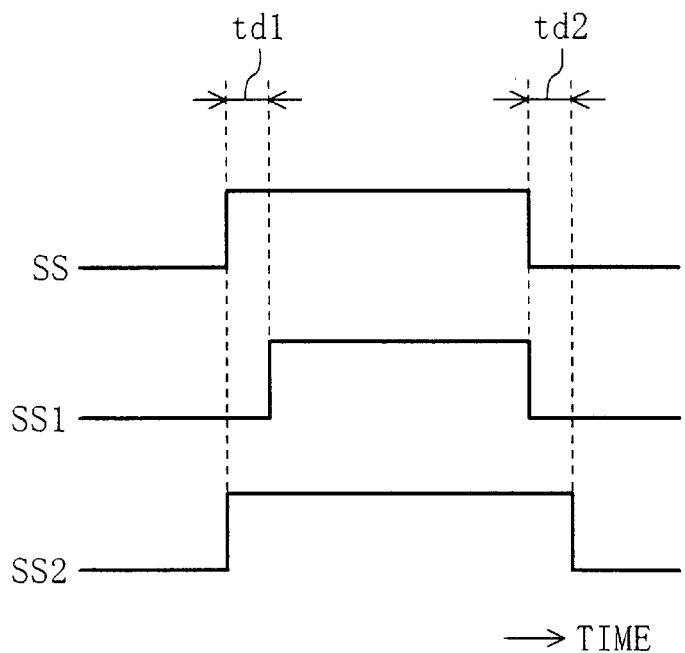
FIG. 9 is a timing diagram showing how the pulse generator shown in FIG. 8 operates.

FIG. 9 illustrates how the pulse generator 6 shown in FIG. 8 operates. In the illustrated embodiment, the propagation delays caused by the first and second delay circuits 71 and 74 will be identified by td1 and td2, respectively. As shown in FIG. 9, the interval during which the common mode voltage Vcm is changed (i.e., the interval during which SS1 is "H") is included in the interval during which the current compensator 2 is decoupled from the twisted pair cable TP/NTP (i.e., the interval during which SS2 is "H"). Accordingly, the current compensator 2 is even less likely to operate erroneously. It should be noted that td1 and td2 may be set to a value between 5 and 10 ns, for example.

Figure 10:
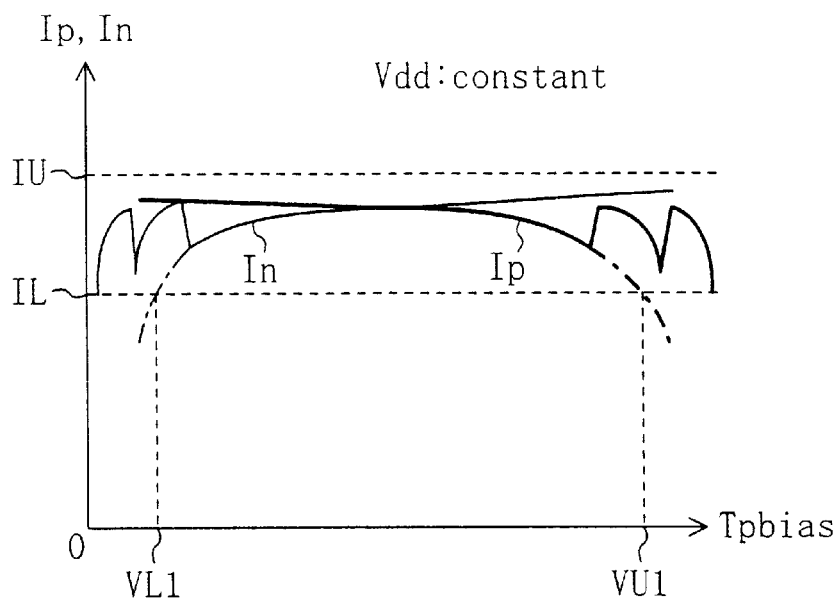
FIG. 10 is a graph showing how effective the common mode voltage monitoring circuit and current compensator shown in FIG. 1 are.
Figure 11:
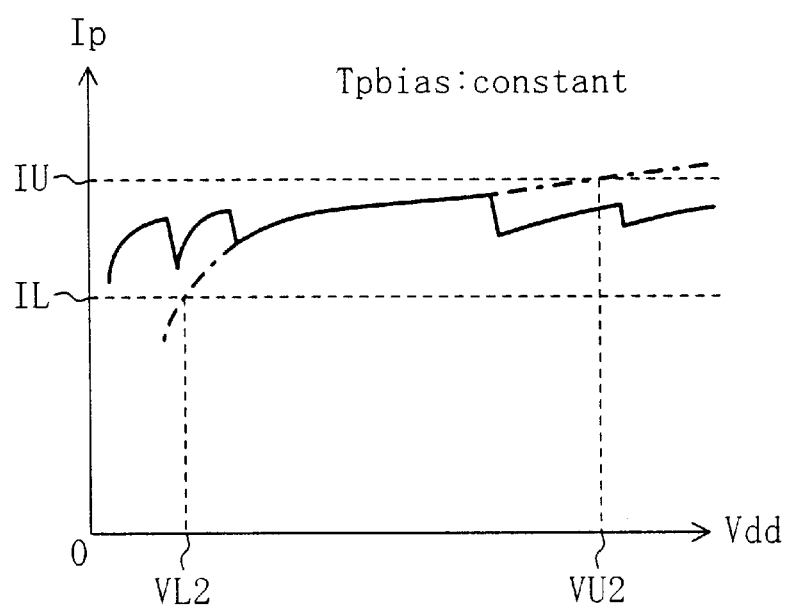
FIG. 11 is a graph showing how effective the supply voltage monitoring circuit and bias regulator shown in FIG. 1 are.

FIG. 10 illustrates how effective the common mode voltage monitoring circuit 1 and current compensator 2 are, while FIG. 11 illustrates how effective the supply voltage monitoring circuit 4 and bias regulator 5 are. In FIGS. 10 and 11, Ip represents the sum of drain current(s) of activated one(s) of the PMOS current source transistors QP10, QP2 and QP1, while In represents the sum of drain current(s) of activated one(s) of the NMOS current source transistors QN10, QN1 and QN2.

As shown in FIG. 10, in the prior art (indicated by the one-dot chain), an allowable terminal bias voltage Tpbias should be between upper- and lower-limit voltages VU1 and VL1 to make the currents Ip and In fall within a predetermined range between upper- and lower-limit currents IU and IL. In contrast, according to the present invention, the range of Tpbias, which corresponds to the currents Ip and In falling within the predetermined range between the upper- and lower-limit currents IU and IL, can be broadened.

Also, as can be seen from FIG. 11, in the prior art (indicated by the one-dot chain), an allowable supply voltage Vdd should be between upper- and lower-limit voltages VU2 and VL2 to make the current Ip fall within a predetermined range between upper- and lower-limit currents IU and IL. In contrast, according to the present invention, the range of Vdd, which corresponds to the current Ip falling within the predetermined range between the upper- and lower-limit currents IU and IL, can be broadened.

Figure 12:
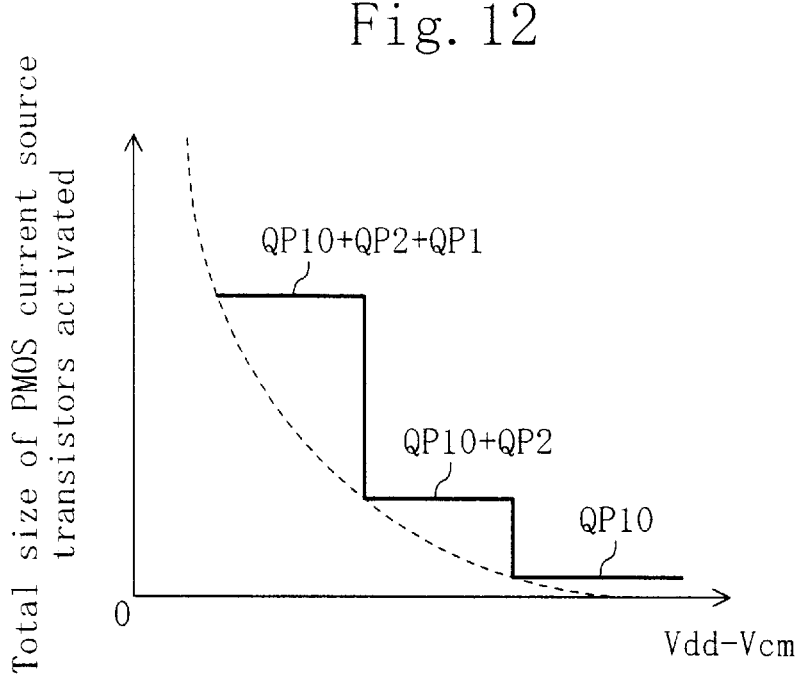
FIG. 12 is a graph showing preferable sizes of three PMOS current source transistors shown in FIGS. 4 and 5.

FIG. 12 illustrates preferable sizes of the three PMOS current source transistors QP10, QP2 and QP1 shown in FIGS. 4 and 5. As can be seen from FIG. 12, the current compensator 2 changes the total size of activated one(s) of the PMOS current source transistors nonlinearly (e.g., exponentially) relative to the difference between the common mode voltage Vcm and the supply voltage level Vdd.

In the example illustrated in FIG. 12, QP2 is greater in size than QP10, and QP1 is greater in size than QP2. As for the three NMOS current source transistors QN10, QN1 and QN2 shown in FIGS. 4 and 5, the total size of activated one(s) of the NMOS current source transistors may be changed nonlinearly relative to the difference between the common mode voltage Vcm and the Vss level (i.e., ground level). By adopting nonlinear control like this, the modes of current compensation do not have to be changed so many times as normal linear control.

Figure 13:
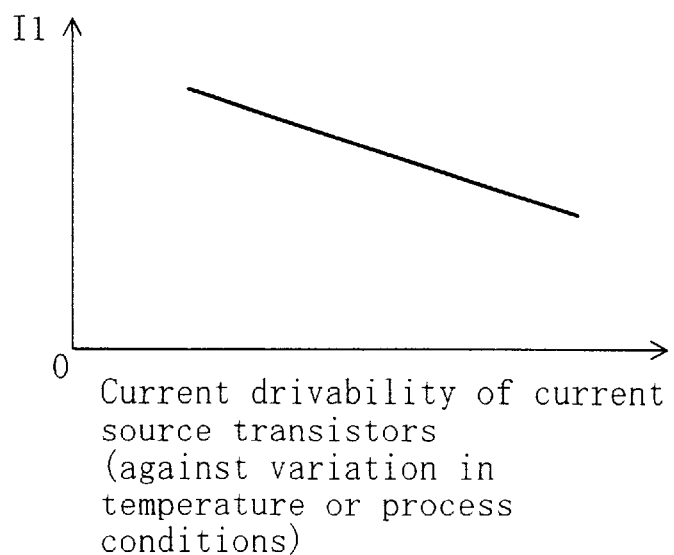
FIG. 13 is a graph showing a preferred variation of a current supplied by the current source shown in FIG. 3.

FIG. 13 illustrates a preferred variation of the current I1 supplied by the current source 33 shown in FIG. 3. The current I1 supplied by the current source 33 is preferably changed according to the current drivability of the PMOS current source transistor QP10 and that of the NMOS current source transistor QN10. This is because the levels sensed by the comparators 31a through 31d of the common mode voltage monitoring circuit 1 can follow a variation in threshold value of the transistors resulting from a variation in temperature or process conditions.

In the foregoing illustrative embodiment, the present invention has been described as being applied to communications between the two transceivers 20 and 21 shown in FIGS. 1 and 2. Naturally, though, the present invention is also applicable to a transmission/reception system in which one unit performs transmission only and the other unit performs reception only.

What is claimed is:

1. A current driver circuit for driving a twisted pair cable, the cable being made up of two signal lines that are coupled to a terminal bias voltage through respective terminal resistors, the driver circuit comprising:
    a current driver coupled to the twisted pair cable;
    a common mode voltage monitoring circuit for monitoring a difference between a common mode voltage of the twisted pair cable and at least one supply voltage level for the current driver; and
    a current compensator, coupled to the twisted pair cable, for compensating for an output current of the current driver in accordance with a result of monitoring performed by the common mode voltage monitoring circuit.

2. The current driver circuit of claim 1, wherein the current compensator compensates stepwise for the output current of the current driver.

3. The current driver circuit of claim 1, wherein the current compensator changes a total size of current source transistors to be activated nonlinearly relative to the difference between the common mode voltage and the supply voltage level.

4. The current driver circuit of claim 1, wherein the current driver includes a PMOS current source transistor and an NMOS current source transistor, and
    wherein the common mode voltage monitoring circuit estimates a difference between a first supply voltage level coupled to the source of the PMOS current source transistor and the common mode voltage and a difference between the common mode voltage and a second supply voltage level coupled to the source of the NMOS current source transistor.

5. The current driver circuit of claim 4, wherein the common mode voltage monitoring circuit comprises:
    a plurality of resistors that are connected in series to each other between the first and second supply voltage levels;
    a current source for supplying a current through the serial connection of the resistors; and
    a plurality of comparators, each said comparator comparing the common mode voltage to a terminal voltage of associated one of the resistors.

6. The current driver circuit of claim 5, wherein each said comparator exhibits hysteresis between input and output thereof.

7. The current driver circuit of claim 5, wherein the current supplied by the current source changes its amount according to current drivability of each of the PMOS and NMOS current source transistors.

8. The current driver circuit of claim 4, further comprising:
    a supply voltage monitoring circuit for monitoring the first supply voltage level; and
    a bias regulator for regulating gate bias voltages of the PMOS and NMOS current source transistors in such a manner as to compensate for the output current of the current driver in accordance with a result of monitoring performed by the supply voltage monitoring circuit.

9. The current driver circuit of claim 1, further comprising means for decoupling the current compensator from the twisted pair cable in transmitting or receiving a signal with the common mode voltage changed.

10. The current driver circuit of claim 9, wherein an interval during which the common mode voltage is changed is included in an interval during which the current compensator is decoupled from the twisted pair cable.

11. A method for transmitting a signal by supplying a current with constant amplitude through a twisted pair cable, the cable being made up of two signal lines that are coupled to a terminal bias voltage through respective terminal resistors, the method comprising the steps of:
    monitoring a difference between a common mode voltage of the twisted pair cable and a supply voltage level for a current driver that drives the twisted pair cable; and
    compensating stepwise for an output current of the current driver in accordance with a result of the monitoring step so that an amount of the current flowing through the twisted pair cable falls within a predetermined range.

* * * * *